Feb. 5, 1924.  
P. SATHER  
VEHICLE HEADLIGHT  
Filed March 13, 1923

Peter Sather,
Inventor

Witnesses:

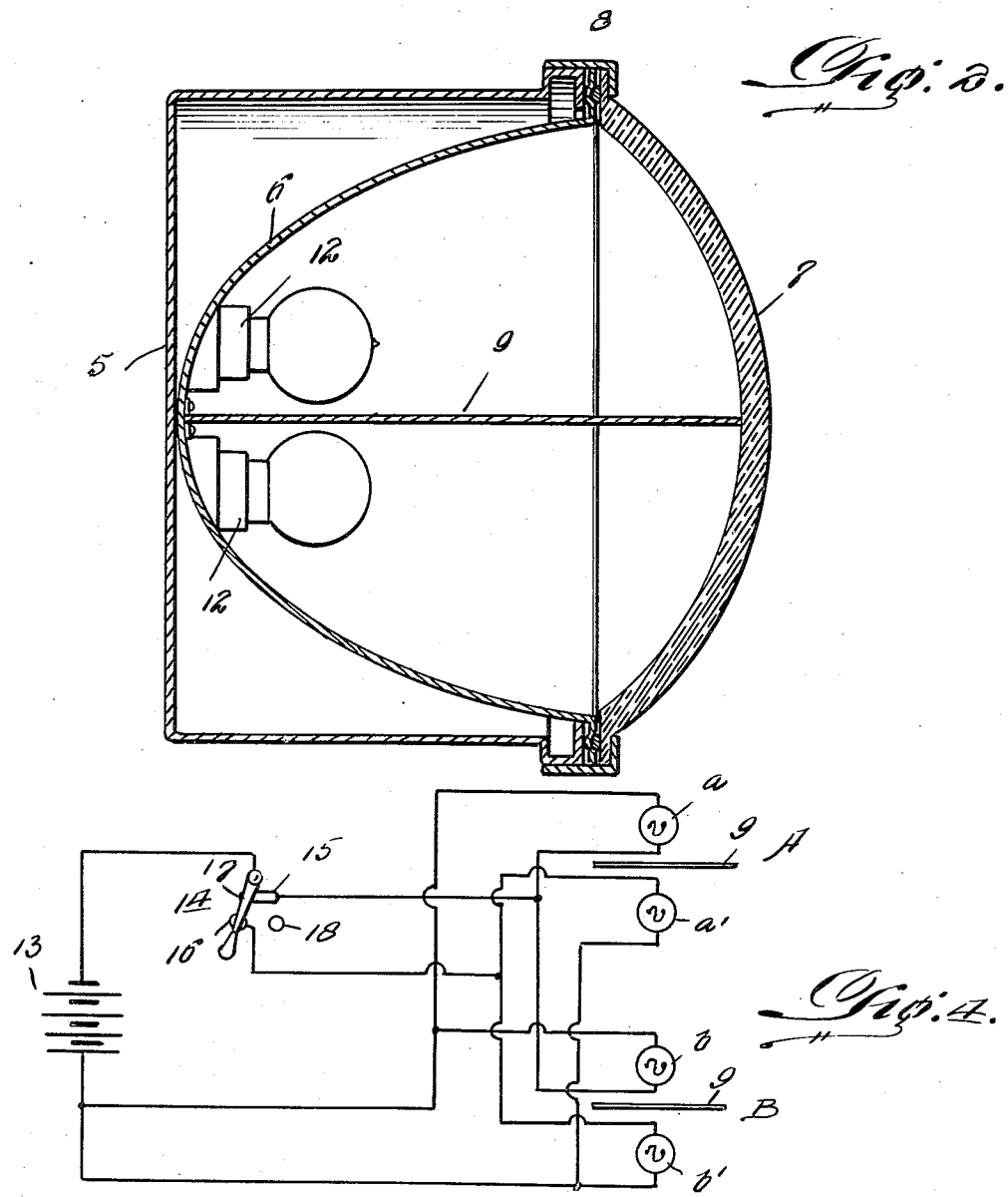

Patented Feb. 5, 1924.

1,482,815

UNITED STATES PATENT OFFICE.

PETER SATHER, OF EAST STANWOOD, WASHINGTON.

VEHICLE HEADLIGHT.

Application filed March 13, 1923. Serial No. 624,692.

*To all whom it may concern:*

Be it known that PETER SATHER, a citizen of the United States, residing at East Stanwood, in the county of Snohomish and State of Washington, has invented certain new and useful Improvements in Vehicle Headlights, of which the following is a specification.

The main purpose of my invention is the provision of a headlight wherein the same is equipped with a pair of electric bulbs, means being provided between these bulbs whereby the light rays from the headlights may be cast to the side of the road when the circuit to a certain one of the lights is broken for consequently overcoming the usual blinding effect of the headlights The nature and advantages of the invention will be better understood when the following detailed description is read in connection with the accompanying drawings, the invention residing in the construction, combination, and arrangement of parts as claimed.

In the drawings forming part of this application, like numerals of reference indicating similar parts in the several views, and wherein:

Figure 2 is a transverse cross sectional view thereof;

Figure 4 is a diagrammatic view of the wiring system between a source of electric energy and pairs of electric lamps within the vehicle headlights.

Figure 1:
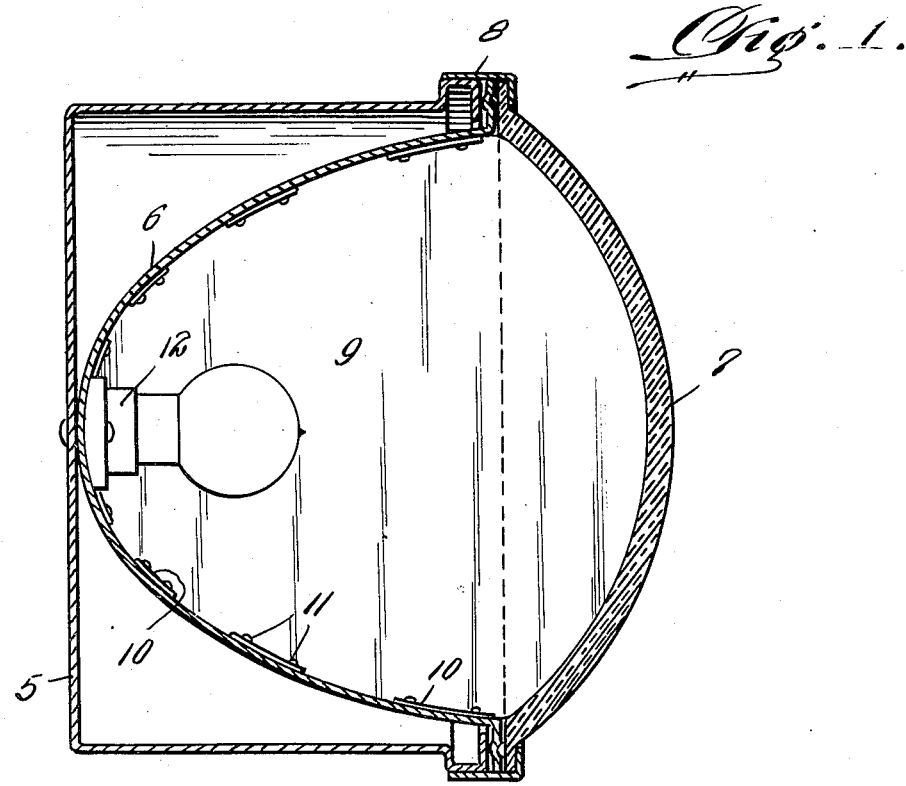
Figure 1 is a vertical transverse cross sectional view of a headlight constructed in accordance with my invention.
Figure 3:
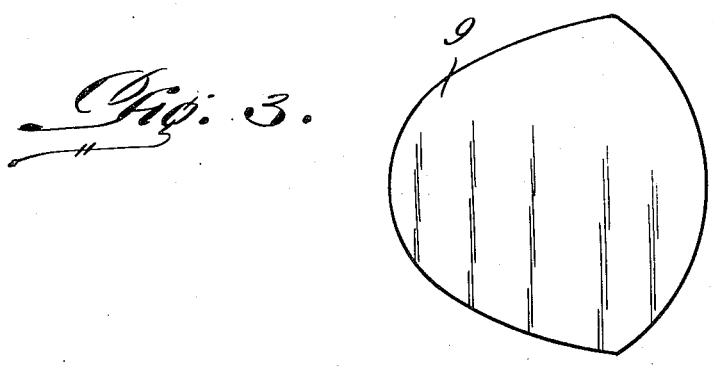
Figure 3 is an elevation of the light rays deflecting plate forming a component part of my improved headlight.

Referring to the drawings in detail, 5 designates a drum-shaped headlight casing; 6 the usual conical reflector; and 7 the concavo-convex lens maintained upon the casing through the instrumentality of a desirable form of rim 8. Within the said reflector 6 is a forwardly extending vertical light deflecting plate 9 the front end of which extends outwardly of the reflector and is curved to have face to face contact with the said lens 7. The remaining edges of this plate 9 are formed upon opposite sides thereof with spaced laterally extending flanges 10 secured as at 11 to said reflector.

Within the reflector 6 upon opposite sides of the plate 9 are electric lamp sockets 12 each of which carries the usual incandescent bulb. Referring to the diagrammatic view of the wiring system in Figure 4, A designates the headlight upon the left side of a motor vehicle and B the headlight upon the right side. The bulbs with the lamp A are designated $a$ and $a'$ respectively while those in the lamp B are designated $b$ and $b'$ respectively, it being noted that each of these lamps are in normally open circuit with the source of electric supply such as a storage battery 13. In the line of circuit is a hand operated switch 14, this switch embodying a pair of stationary contacts 15 and 16 and a movable contact 17. The movable contact 17 is normally in position as shown in Figure 4 for consequently completing the circuit in the lamps to each headlight and whenever it is desired to throw the light rays from the lamps to the right-hand side of the road for preventing the blinding of the drivers of oncoming cars the said movable contact 17 is moved to a position 18 which will consequently break the circuit to the lamps $a'$ and $b'$.

Although I have herein shown and described the preferred embodiment of the present invention, it is nevertheless to be understood that minor changes may be made therein, without departing from the spirit and scope of the invention as claimed.

Having thus described my invention, what I claim as new and desire to secure by Letters Patent is:

A headlight lamp structure comprising a casing, a concavo-convex lens closing the forward end of the casing and disposed with its intermediate portion in advance of the forward edge of the casing, a concaved reflector housed within the casing and having its forward edge in contact with the edge portion of the lens, a plate disposed in the median vertical plane of the casing and housed within the reflector and the lens, and dividing the area therein into two compartments, the forward portion of the plate being disposed in advance of the forward edge of the lamp casing, and bulbs located in the compartment and disposed one at each side of the plate.

In testimony whereof I affix my signature.

PETER SATHER.